US012676722B2

(12) United States Patent
Yang et al.

(10) Patent No.: US 12,676,722 B2
(45) Date of Patent: Jul. 7, 2026

(54) TRANSMITTING A CONTROL SIGNAL SCHEDULING A DISCOVERY SIGNAL IN SIDELINK

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US); Shaozhen Guo, Beijing (CN); Rajat Prakash, San Diego, CA (US); Hao Xu, Beijing (CN); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 18/561,860

(22) PCT Filed: Jul. 15, 2021

(86) PCT No.: PCT/CN2021/106441
§ 371 (c)(1),
(2) Date: Nov. 17, 2023

(87) PCT Pub. No.: WO2023/283870
PCT Pub. Date: Jan. 19, 2023

(65) Prior Publication Data
US 2024/0243883 A1 Jul. 18, 2024

(51) Int. Cl.
*H04W 4/00* (2018.01)
*H04L 5/00* (2006.01)
*H04L 27/26* (2006.01)
(52) U.S. Cl.
CPC .......... *H04L 5/0053* (2013.01); *H04L 5/0005* (2013.01); *H04L 27/261* (2013.01)

(58) Field of Classification Search
CPC ... H04L 5/0053; H04L 5/0005; H04L 27/261; H04L 5/0048; H04L 5/0094;
(Continued)

(56) References Cited

U.S. PATENT DOCUMENTS

| | | | |
|---|---|---|---|
| 12,432,760 B2 * | 9/2025 | Ryu | ................. H04W 72/0473 |
| 2020/0153574 A1 * | 5/2020 | Shin | ........................ H04W 4/40 |

(Continued)

FOREIGN PATENT DOCUMENTS

| | | | |
|---|---|---|---|
| CN | 111448807 A | 7/2020 | |
| CN | 112655255 A | * 4/2021 | ............ H04W 72/23 |

(Continued)

OTHER PUBLICATIONS

Huawei: "Summary of Offline Discussion [AT109bis-e][701][V2X] RRC Open Issues and ASN.1 Class2/3 Issues", 3GPP TSG-RAN WG2 Meeting #109-bis electronic, R2-2004071, Apr. 20-30, 2020, the whole document, pp. 1-116.

(Continued)

*Primary Examiner* — Phuongchau Ba Nguyen
(74) *Attorney, Agent, or Firm* — Patterson + Sheridan, L.L.P.

(57) ABSTRACT

Certain aspects of the present disclosure provide techniques for determining a relay capability configuration for using a control signal to schedule a physical sidelink shared channel (PSSCH) that carries information to organize sidelink connections. The control signal allows user equipments (UEs) to organize a sidelink network absent base station configurations or vendor configurations. For example, the control signal may schedule a discovery signal (DS) associated with a sidelink synchronization signal block (S-SSB). The control signal may be referred to as DS-physical sidelink control channel (DS-PSCCH), different from a normal PSCCH. The (Continued)

DS-PSCCH may have distinct structure and content to allow UEs to organize sidelink networks.

26 Claims, 15 Drawing Sheets

(58) Field of Classification Search
CPC .... H04L 5/0007; H04W 28/04; H04W 72/04; H04W 72/042; H04W 88/08; H04W 28/08; H04W 28/084; H04W 36/22; H04W 72/12
See application file for complete search history.

(56) References Cited

U.S. PATENT DOCUMENTS

| | | | |
|---|---|---|---|
| 2020/0196255 A1 | 6/2020 | Cheng et al. | |
| 2020/0359375 A1 | 11/2020 | Hwang et al. | |
| 2021/0099994 A1 | 4/2021 | Park et al. | |
| 2021/0168574 A1* | 6/2021 | Zhang | H04L 5/0048 |
| 2021/0243776 A1* | 8/2021 | Zhao | H04L 5/0053 |
| 2021/0410084 A1* | 12/2021 | Li | H04W 52/265 |
| 2022/0166582 A1* | 5/2022 | Hwang | H04W 56/0025 |
| 2022/0167313 A1* | 5/2022 | Zhou | H04W 72/0453 |
| 2023/0007462 A1* | 1/2023 | Sun | H04W 56/001 |
| 2023/0319745 A1* | 10/2023 | Liu | H04W 72/1263 370/503 |
| 2024/0405953 A1* | 12/2024 | He | H04B 7/0695 |

FOREIGN PATENT DOCUMENTS

| | | |
|---|---|---|
| WO | 2020096693 A1 | 5/2020 |
| WO | 2021029733 A1 | 2/2021 |

OTHER PUBLICATIONS

International Search Report and Written Opinion—PCT/CN2021/106441—ISA/EPO—Feb. 24, 2022.

Supplementary European Search Report—EP21949658—Search Authority—Munich—Feb. 6, 2025.

* cited by examiner

500

Uu

Relay UE gNB

Uu

PC5

Transmitter UE

502

Uu

Relay UE gNB

PC5

Transmitter UE

800

802

TRANSMIT, BY A FIRST USER EQUIPMENT (UE), A SIDELINK SYNCHRONIZATION SIGNAL BLOCK (S-SSB) TO BE RECEIVED BY AT LEAST A SECOND UE

804

TRANSMIT A CONTROL SIGNAL ASSOCIATED WITH THE S-SSB TO SCHEDULE A PHYSICAL SIDELINK SHARED CHANNEL (PSSCH) THAT CONVEYS SYSTEM INFORMATION (SI) FOR THE SECOND UE

TRANSMITTING A CONTROL SIGNAL SCHEDULING A DISCOVERY SIGNAL IN SIDELINK

CROSS-REFERENCE TO RELATED APPLICATIONS

This application is a national stage application under 35 U.S.C. 371 of PCT/CN2021/106441, filed Jul. 15, 2021, which is hereby expressly incorporated by reference herein in its entirety as if fully set forth below and for all applicable purposes.

BACKGROUND

Field of the Disclosure

Aspects of present disclosure relate to wireless communications and, more particularly, to techniques for sidelink communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, the NR supports beamforming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for organizing a sidelink network among user equipments (UEs) without a base station (BS). For example, one lead UE may transmit a sidelink synchronization signal block (S-SSB) for discovery by another UE. The lead UE may transmit and use a control signal associated with the S-SSB to schedule a physical sidelink shared channel (PSSCH) that conveys system information (SI) for the other UE.

Certain aspects of the subject matter described in this disclosure can be implemented in a method for wireless communication by a first UE. The method may include transmitting a sidelink synchronization signal block (S-SSB) for discovery by at least a second UE; and transmitting a control signal associated with the S-SSB to schedule a physical sidelink shared channel (PSSCH) that conveys system information (SI) for the second UE.

Certain aspects of the subject matter described in this disclosure can be implemented in a method for wireless communication by a second UE. The method may include receiving a sidelink synchronization signal block (S-SSB) transmitted by a first UE; receiving a control signal associated with the S-SSB to schedule a physical sidelink shared channel (PSSCH) that conveys system information (SI) for the second UE; and receiving the PSSCH from the first UE according to the control signal.

Aspects of the present disclosure provide means for, apparatus, processors, and computer-readable mediums for performing techniques and methods that may be complementary to the operations by the UE described herein, for example, by a transmitter UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
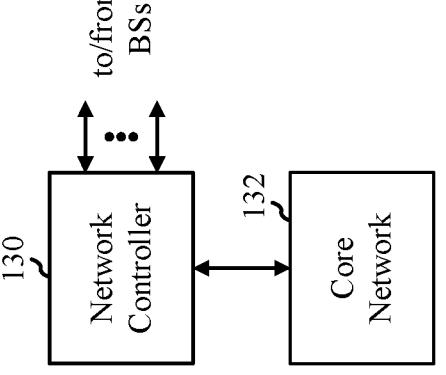
FIG. 1 is a block diagram conceptually illustrating an example wireless communication network, in accordance with certain aspects of the present disclosure.

Aspects of present disclosure provide apparatus, methods, processing systems, and computer readable mediums for scheduling a physical sidelink shared channel (PSSCH) that carries information to organize sidelink connections. The PSSCH may be scheduled using a control signal that may allow user equipments (UEs) to organize a sidelink network absent base station configurations or vendor configurations. For example, the control signal may schedule a discovery signal (DS) associated with a sidelink synchronization signal block (S-SSB). The control signal may be referred to as DS-physical sidelink control channel (DS-PSCCH), different from a normal PSCCH. The DS-PSCCH may have distinct structure and content to allow UEs to organize sidelink networks.

Sidelink communications among UEs (e.g., in vehicle-to-everything, or V2X applications) may take advantage of the wideband unlicensed channel and support enhanced-mobile-broadband (eMBB) and internet-of-things (IOT) use cases. In these use cases, a base station (gNodeB, or gNB) is generally not available, i.e., the UEs are out of coverage. Even if some UEs may be in coverage, the in-coverage UEs may not share a universal setting that allows the UEs naturally communicate with each other without further sensing or configuration/synchronization. Therefore, the UEs need to self-organize to form a sidelink network without expecting configurations from the gNB or UE vendor. The present disclosure provides techniques for one or more UEs to initiate sidelink network organization, such as by setting up resource pools, coordinating configurations, and the like.

The disclosed techniques thus enable deployment of UEs in sidelink eMBB use cases in various scenarios. For example, the UEs may not belong to the same operator or may not have a subscription. The UEs may not receive sidelink configuration from a base station or from a vendor (e.g., vendors may agree to a common configuration). The UEs may not have sufficient licensed spectrum for sidelink communications.

According to the present disclosure, UEs may detect and synchronize with each other to organize sidelink communications in these scenarios. At a high level, a discovery signal and the associated mechanism may enable a UE to initiate the organization of a sidelink network. For example, the discovery signal may include remaining minimum system information (RMSI) to provide node access information (e.g., different from the RMSI in a Uu interface).

According to aspects of the present disclosure, the RMSI may be carried by a PSSCH scheduled by a control signal. Using the control signal to schedule allows for flexibility for the PSSCH and does not require the PSSCH to carry the RMSI (although in some cases, the PSSCH may carry the RMSI, integrated with an S-SSB). This may avoid always sending the RMSI in the PSSCH in a limited number of available bits in the master information block (MIB). Examples of locations and sizes of resource allocated for DS-PSCCH are further discussed in the examples below.

The following description provides examples of techniques for using a control signal to schedule a PSSCH for carrying information to organize sidelink connections, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. The RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

The NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. The NR supports beamforming and beam direction may be dynamically configured. Multiple-input multiple-output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. The wireless communication network 100 may include base stations (BSs) 110a-z (each also individually referred to herein as BS 110 or collectively as BSs 110). The wireless communication network 100 may further include user equipments (UEs) 120a-y (each also individually referred to herein as UE 120 or collectively as UEs 120). The UEs 120a and 120b may each include a respective discovery signal manager 122a and 122b. Although the UEs 120 are illustrated to be within the coverage of the BSs 110, the present disclosure is as well applicable to situations where one or more UEs 120 are outside of the coverage of the BSs 110. For example, two or more UEs 120 that are outside of the coverage of the BSs 110 may nonetheless perform operations disclosed herein, to use discovery signals to initiate and organize sidelink networks.

As shown in FIG. 1, the wireless communication network 100 may be an NR system (e.g., a 5G NR network) in communication with a core network 132. The core network 132 may be in communication with the BSs 110 and/or the UEs 120 in the wireless communication network 100 via one or more interfaces.

The UEs 120 may be configured for a sidelink communication. Each UE 120 may be synchronized. As shown in FIG. 1, a UE 120a may be a transmitter UE, which may be synchronized to the core network 132 using a synchronization signal from one of the other UEs 120. The UE 120a may include a discovery signal manager 122a. The discovery signal manager 122a may transmit an S-SSB to be received by another UE and transmit a control signal associated with the S-SSB to schedule a PSSCH that conveys system information for the other UE. Also, as shown in FIG. 1, a UE 120b may be a receiver UE, which may receive the S-SSB transmitted by the UE 120a. The UE 120b may include another discovery signal manager 122b. The discovery signal manager 122b may receive the S-SSB and a control signal associated with the S-SSB to schedule a PSSCH. The UE 120b may then receive the PSSCH from the UE 120a according to the control signal. In aspects, the discovery signal managers 122a and 122b may perform the operations 800 and 900 of FIGS. 8 and 9, as discussed below.

The BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in the wireless communication network 100 through various types of backhaul interfaces (e.g., a direct physical connection, a wireless connection, a virtual network, or the like) using any suitable transport network. In the example shown in FIG. 1, BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. The BS 110 may support one or multiple cells.

The BSs 110 may communicate with the UEs 120 in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., a relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
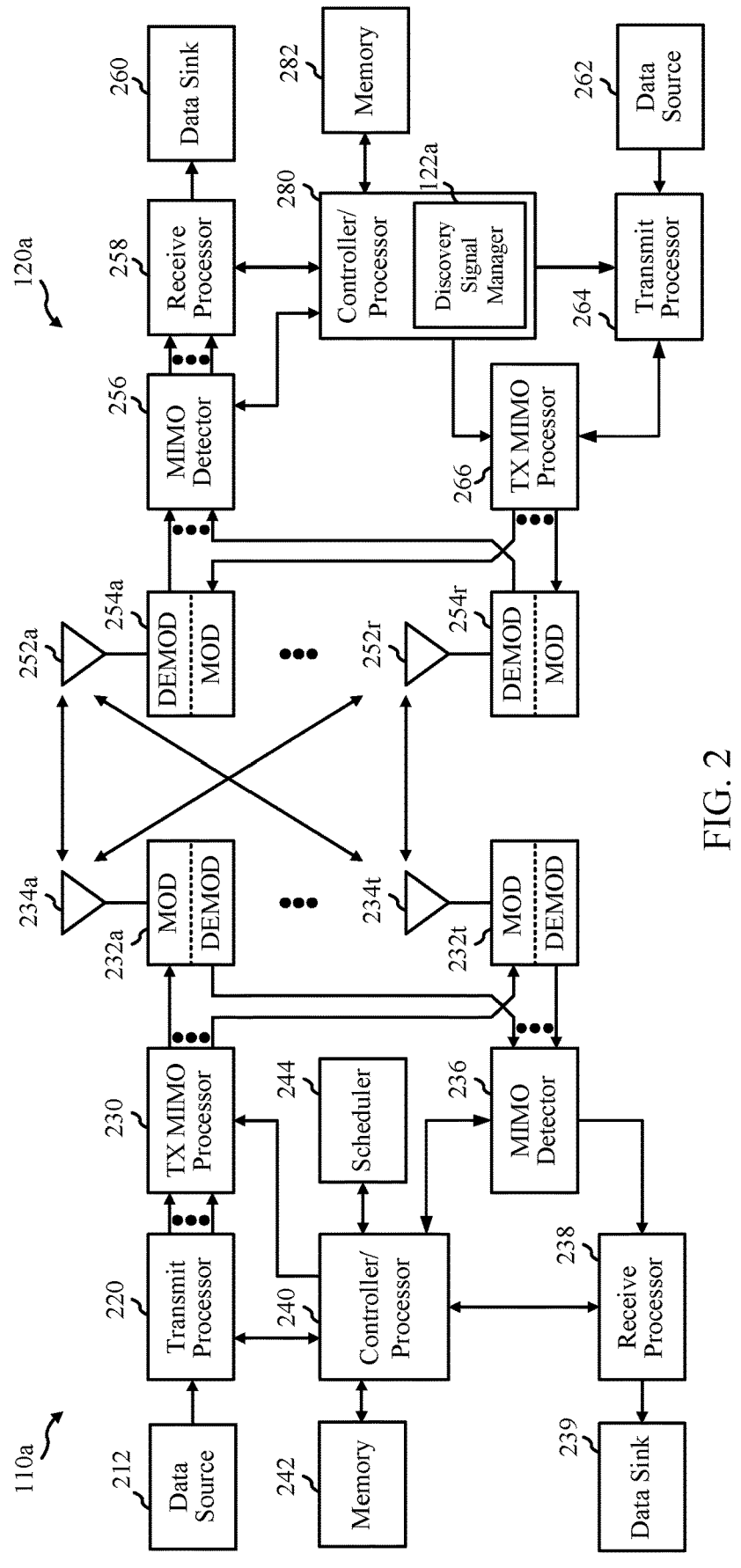
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and the control information to obtain data symbols and control symbols, respectively. The transmit processor 220 may also generate reference symbols, such as for a primary synchronization signal (PSS), a secondary synchronization signal (SSS), a PBCH demodulation reference signal (DMRS), and a channel state information reference signal (CSI-RS). A transmit (TX) MIMO processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a downlink signal. The downlink signals from the MODs in transceivers 232a-232t may be transmitted via the antennas in transceivers 234a-234t, respectively.

At the UE 120a, antennas 252a-252r may receive the downlink signals from the BS 110a and may provide received signals to demodulators (DEMODs) in transceivers 254a-254r, respectively. Each DEMOD in transceivers 254a-254r may condition (e.g., filter, amplify, downconvert, and digitize) a respective received signal to obtain input samples. Each DEMOD in transceivers 254a-254r may further process the input samples (e.g., for OFDM, etc.) to obtain received symbols. A MIMO detector 256 may obtain received symbols from all the DEMODs in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the DEMODs in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for the BS 110a and the UE 120a, respectively. A scheduler 244 may schedule UEs for data transmission on the downlink and/or the uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a may include a discovery signal manager 122a. When UE 120a is acting as a transmitter UE, the discovery signal manager 122a may transmit an S-SSB to be received by at least a second UE. The discovery signal manager 122a may further transmit a control signal associated with the S-SSB to schedule a PSSCH that conveys system information for the second UE. When UE 120a is acting as a receiver UE, the discovery signal manager 122a may also receive an S-SSB transmitted by another UE and receive a control signal associated with the S-SSB. The discovery signal manager 122a may then receive a PSSCH according to the received control signal.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
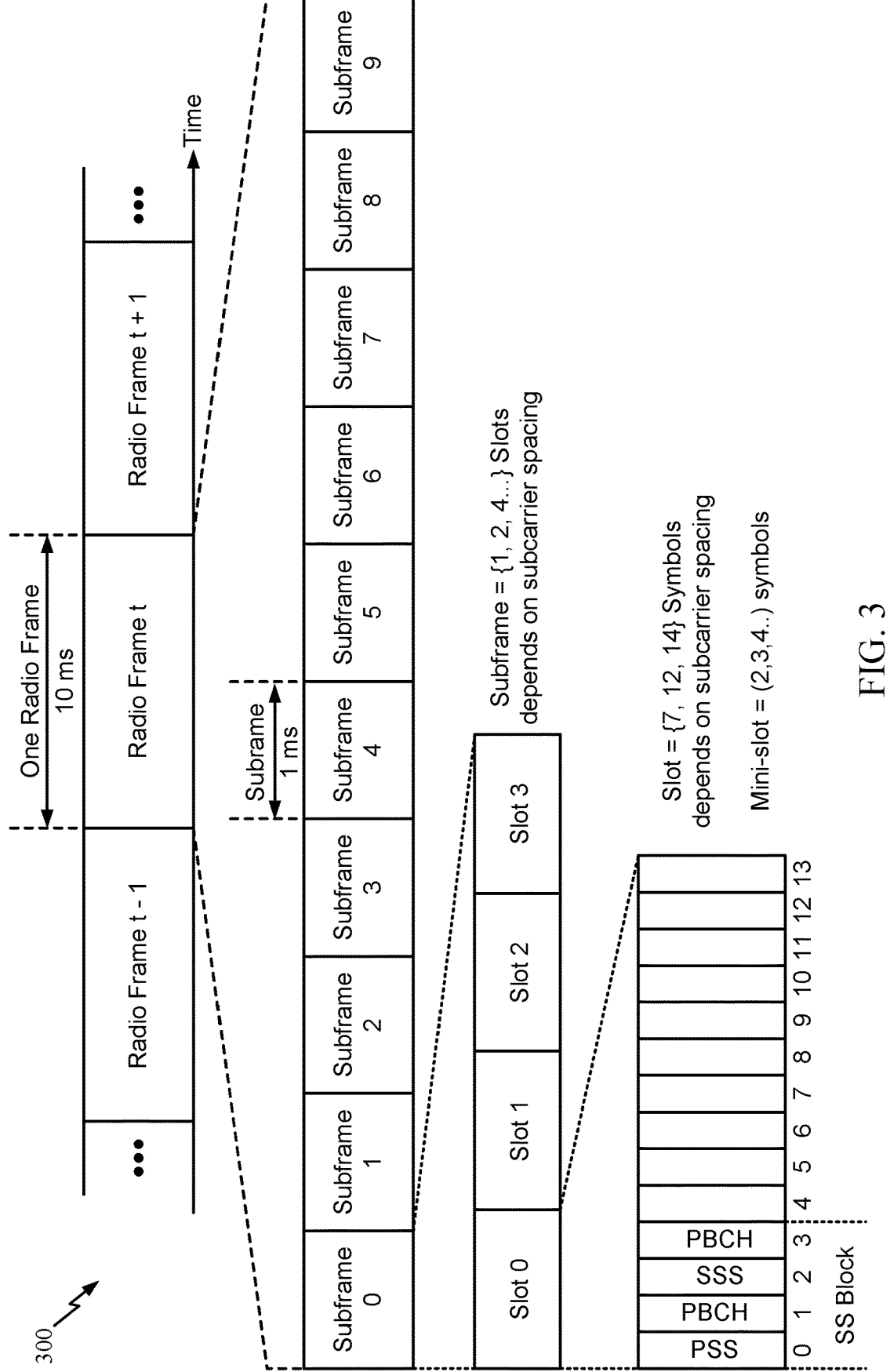
FIG. 3 is an example frame format for certain wireless communication systems (e.g., a new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2X) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2X, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Example Sidelink Communication

Figures 4A, 4B:
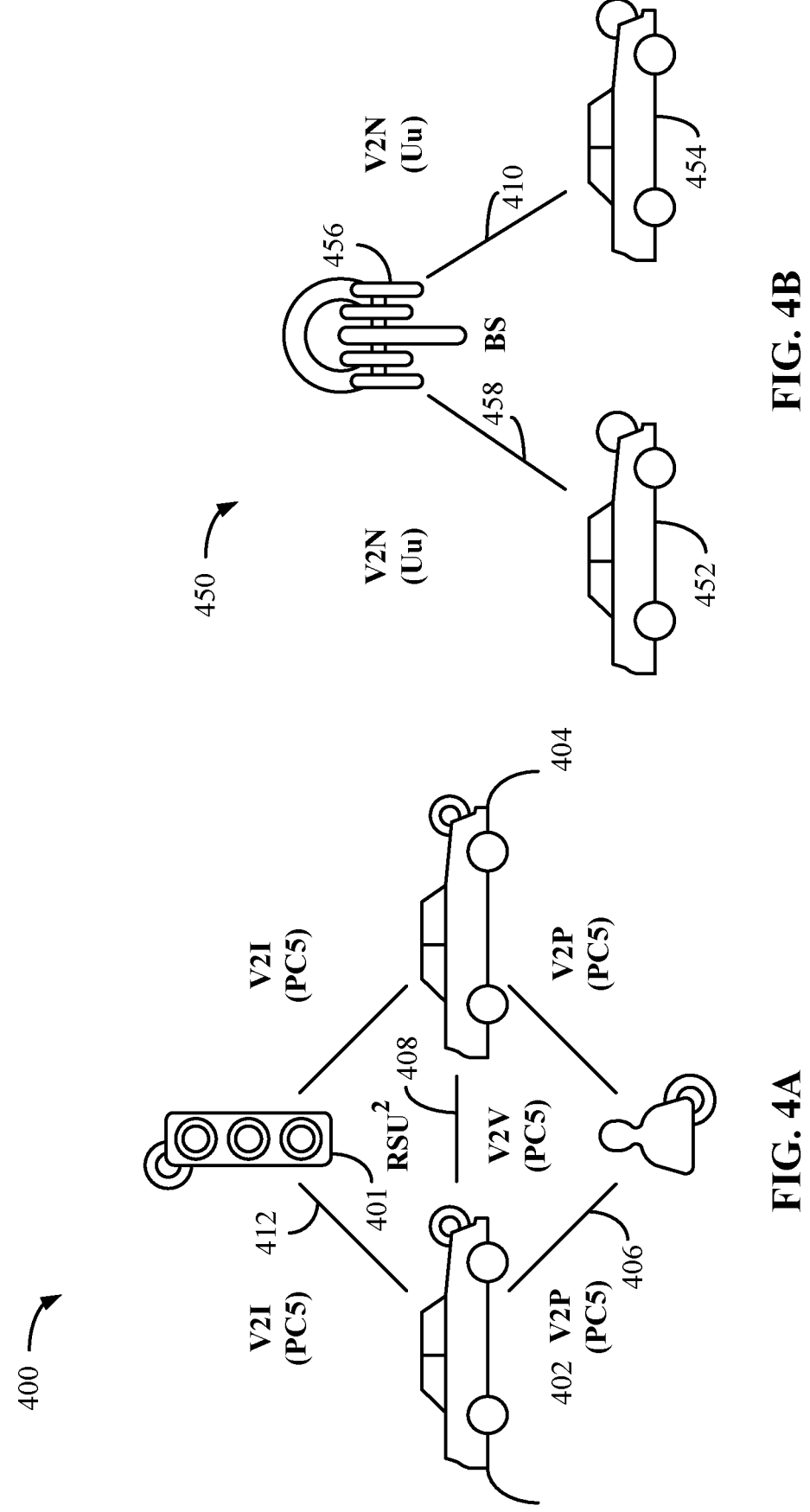
FIG. 4A and FIG. 4B show diagrammatic representations of example vehicle to everything (V2X) systems, in accordance with certain aspects of the present disclosure.

FIG. 4A and FIG. 4B show diagrammatic representations of example vehicle to everything (V2X) systems, in accordance with some aspects of the present disclosure. Vehicles shown in FIG. 4A and FIG. 4B may communicate via sidelink channels and may perform control signal transmissions as described herein (e.g., in vehicle-to-vehicle, or V2V situations). In addition to the example application of sidelink communications in the V2X systems, implementations of the present disclosure is not limited to V2X systems, such as when no common vender or gNB configuration is available (e.g., when the vehicles 402 and 404 are out-of-coverage).

The V2X systems, provided in FIG. 4A and FIG. 4B provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to everything (V2X) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 401), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QOS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Figures 5A, 5B:
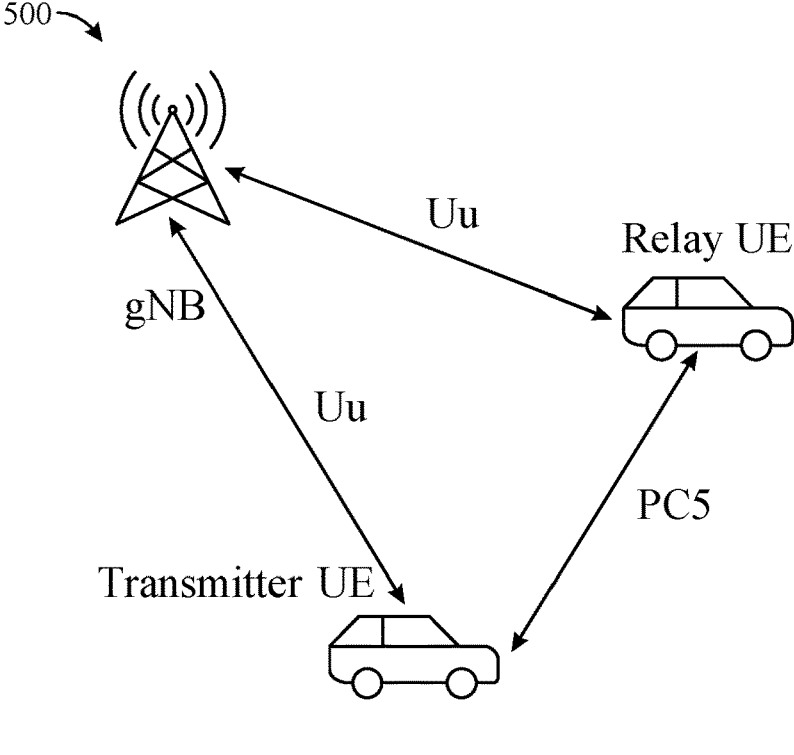
FIG. 5A and FIG. 5B show diagrammatic representations of example vehicle to everything (V2X) systems, in accordance with certain aspects of the present disclosure.

In some cases, vehicles (e.g., UEs) within a V2X system may have a relay capability and operate as relay UEs (e.g., in-coverage UEs). FIGS. 5A-5B illustrate example V2X systems 500, 502 in which certain UEs may operate as relay UEs. As shown, the V2X systems 500, 502 illustrated in FIGS. 5A-5B may include a base station (e.g., gNB), a first vehicle (e.g., a transmitter UE) and a second vehicle (e.g., second UE). In some cases, the V2X systems 500, 502 may be an example of the V2X/V2X systems 400, 450 described above with reference to FIGS. 4A and 4B.

In some cases, the transmitter UE may communicate directly with the gNB via a Uu interface or indirectly with the gNB via the relay UE via a PC5 interface. For example, as illustrated in FIG. 5A, the transmitter UE may communicate directly with the gNB using the Uu interface or may communicate with the gNB indirectly via the relay UE using a PC5 interface. In other cases, as illustrated in FIG. 5B, the transmitter UE may only indirectly communicate with the gNB via the relay UE using the PC5 interface. For example, in some cases, the transmitter UE may communicate with the relay UE via a PC5 interface to send a message. Thereafter, the relay UE may forward this message to the gNB via the Uu interface. Similarly, the gNB may communicate with the transmitter UE via the relay UE.

In some cases, relay UEs within the V2X systems 500, 502 illustrated in FIGS. 5A-5B may have or be associated with different relay capabilities. For example, in some cases, the relay capabilities may include or may be associated with a discontinuous reception (DRX) cycle of the relay UE, traffic on a Uu link and/or PC5 link associated with the relay UE, a channel quality associated with a sidelink (e.g., PC5 link), a number of other UEs that the relay UE is connected to, a time source of the relay UE, and/or channel state information (CSI) associated with a Uu link of the relay UE. Example Sidelink Synchronization When a base station (e.g., a gNB) is available, UEs that are in coverage are expected to follow the same timing reference as the base station. If none available, the timing references of the deployed UEs are desired to be aligned with each other. Both may be achieved via synchronization procedures, such as global navigation satellite system (GNSS) based and gNB based synchronization procedures, for example. When a UE powers on, the UE may search for synchronization signal block (SSB) signals available (e.g., provided by the GNSS or gNB). The SSB signals may be directly provided by the GNSS or gNB, or indirectly provided by another UE within the coverage of the GNSS or gNB. When none available, sidelink SSB (S-SSB) may still be provided for synchronization, according to aspects of the present disclosure.

Figure 6:
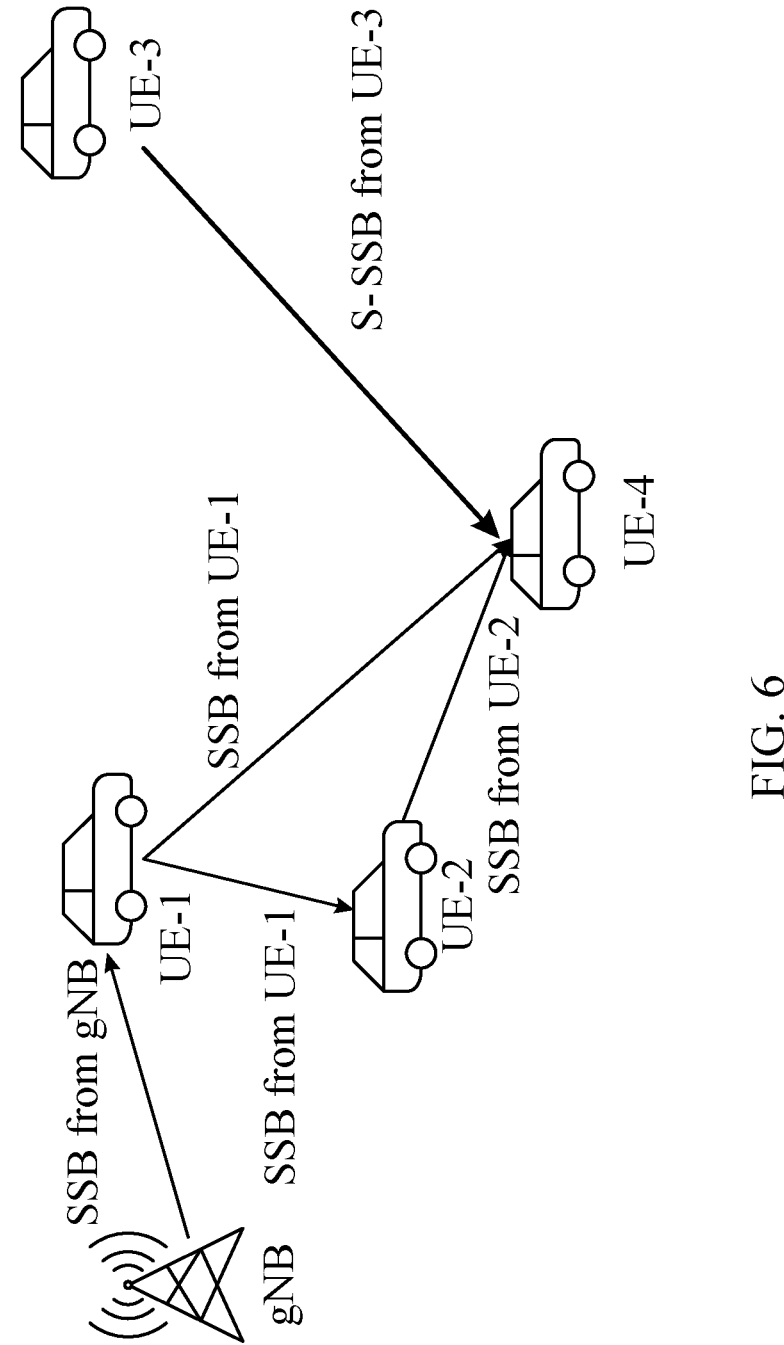
FIG. 6 shows a diagrammatic representation of an example V2X system, in accordance with certain aspects of the present disclosure.

An example of synchronizing within the V2X system is illustrated in FIG. 6. For example, FIG. 6 shows an example V2X system 600 implementing aspects of FIGS. 4A-4B and 5A-5B. As shown, in one example, the V2X system 600 illustrated in FIG. 6 may include a first UE (e.g., a UE-1), a second UE (e.g., a UE-2), a third UE (e.g., a UE-3), and a fourth UE (e.g., a UE-4). The V2X system may further include a base station (BS) (e.g., a gNB).

In an example, nodes of the V2X system 600, such as the UEs and the BS may be synchronized. The nodes may be synchronized using multiple synchronization techniques. One technique is Global Navigation Satellite System (GNSS) based synchronization, which prioritizes GNSS signals for synchronization. Another technique is gNB/eNB based synchronization, which prioritizes eNB/gNB SSB signal for synchronization. In another example, sidelink UEs (e.g., UE-3) out-of-coverage may use S-SSB for synchronization.

In some cases, each node in the V2X system 600 may receive synchronization signals from different synchronization sources. For example, in some cases, UE-1 may receive the synchronization signals directly from the gNB. In other cases, the nodes may receive the synchronization signals from the GNSS (not shown). In either case, each node may synchronize to the V2X system/network 600 using a synchronization signal received from a synchronization source based on a priority associated with that synchronization source and/or synchronization signal, as explained below. In some cases, UE-2 or UE-4 may receive the SSB from UE-1, thus indirectly receiving the SSB from the gNB or GNSS. In some cases, UE-4 may receive S-SSB from UE-3, which is outside of the coverage by the gNB or UE-1 to receive SSB directly or indirectly from the gNB.

In the V2X system 600, when the UEs turn on, each UE may search for a nearby NR network. For example, in some cases, while searching for a nearby NR network, the UEs (e.g., UE-1) may receive the synchronization signals from the gNB. However, in other cases, the UEs in the V2X system 600 (e.g., the UE-2, the UE-3, the UE-4) may not receive the synchronization signals from the gNB, but may instead search for and receive the synchronization signals (i.e., sidelink synchronization signals) from other UEs in the V2X system 600.

For example, as shown, when UE-1 turns on, UE-1 may search for the nearby NR network and may discover the gNB, which belongs to the NR network. To assist with discovery and synchronization with the gNB, the gNB may transmit a synchronization signal block (SSB) that includes, for example, a primary synchronization signal (PSS), a secondary synchronization signal (SSS), and a physical broadcast channel (PBCH) (e.g., including a master information block (MIB)) periodically in different transmit directions (e.g., beams). Accordingly, UE-1 may receive the SSB from the gNB and may synchronize to the NR network based on the received SSB. In this case, the gNB may function as UE-1's synchronization source. Thereafter, once UE-1 is synchronized, the UE-1 may perform an attach procedure with the BS and begin camping on a cell associated with the gNB.

While UE-1 may receive the synchronization signals from the gNB and use the gNB as a synchronization source, UE-2 may instead receive SSBs from other UEs, such as UE-1, and may use UE-1 as a synchronization source. For example, when UE-2 turn on, UE-2 may search for the nearby NR network. However, in this case, UE-2 may instead discover the UE-1, which belongs to the NR network. As with the gNB, UE-1 may transmit SSBs periodically in different transmit directions. UE-2 may receive the SSBs from the UE-1 and may synchronize to the NR network based on the received SSBs. Here, UE-1 may function as a synchronization source for UE-2. Thereafter, in some cases, UE-2 may perform an attach procedure with UE-1 to access the NR network.

In some cases, a UE may discover multiple other UEs when searching for the nearby NR network. For example, in some cases, when the UE-4 turns on, the UE-4 may search for the nearby NR network and may discover UE-1 and UE-2 belonging to the NR network. UE-1 and UE-2 may transmit the SSB periodically in different transmit directions, which may be received by UE-4. In such cases, when the UE-4 receives multiple SSBs from multiple other UEs, the UE-4 may be configured to select, and synchronize to, the SSB according to a priority associated with the SSB. In some cases, the priority of each SSB may be indicated within each SSB itself. In some cases, the UE-4 may determine priority information associated with each received SSB based on one or more predetermined tables, which define different priorities of synchronization signals (e.g., SSBs) based on, for example, where the synchronization signals are coming from and the type of synchronization technique preferred (e.g., GNSS-based synchronization vs. eNB/gNB-based synchronization).

For example, as shown below, for GNSS-based synchronization, a synchronization signal received from another UE that is directly synchronized to GNSS may have a highest priority (e.g., P1) while synchronization signals received from UEs that are indirectly synchronized to a gNB/eNB may have a lower priority (e.g., P5).

TABLE 1

| GNSS-Based Synchronization Priorities<br>GNSS based synchronization | |
| --- | --- |
| P1 | UE directly synchronized to GNSS |
| P2 | UE indirectly synchronized to the GNSS |
| P3 | eNB/gNB |
| P4 | UE directly synchronized to eNB/gNB |
| P5 | UE indirectly synchronized to gNB/eNB |
| P6 | Remaining UEs |

As shown in Table 2, below, for gNB/eNB-based synchronization, a synchronization signal received from another UE that is directly synchronized to a gNB/eNB may have a highest priority (e.g., P1) while synchronization signals received from UEs that are indirectly synchronized to GNSS may have a lower priority (e.g., P5).

TABLE 2

| gNB/eNB-Based Synchronization Priorities<br>gNB/eNB based synchronization | |
| --- | --- |
| P1 | UE directly synchronized to gNB/eNB |
| P2 | UE indirectly synchronized to gNB/eNB |
| P3 | GNSS |
| P4 | UE directly synchronized to GNSS |
| P5 | UE indirectly synchronized to GNSS |
| P6 | Remaining UEs |

In certain cases, in response to receiving SSBs from UE-1 and UE-2, the UE-4 may evaluate information associated with each SSB to determine which SSB has a highest priority. For example, in some cases, if the V2X system 600 is gNB/eNB-synchronization based, the UE-4 may determine that the SSB received from the UE-1 has a higher priority (e.g., P1) than the SSB received from the UE-2 (e.g., P2) and the SSB received from the UE-3 (e.g., P2), since the UE-1 is directly synchronized to the BS while UE-2 are indirectly synchronized to the BS via UE-1. Accordingly, in this case, the UE-4 may select the SSB from the UE-1 having the highest priority for synchronization.

In some cases, UE-3 illustrates UEs that are out of coverage of the gNB and other in-coverage UEs. Although UE-1, UE-2, and UE-4 are shown to be directly or indirectly in coverage of the gNB in FIG. 6, UE-1, UE-2, and UE-4 may be out of the gNB coverage along with UE-3 and still organize a sidelink network, according to aspects of the present disclosure. In such cases, sidelink configuration may not be expected from the gNB. Similarly, the out-of-coverage UEs may not belong to the same operator. Some of the UEs may not have subscription. Accordingly, there is a need for a technique that allows the out-of-coverage UEs to organize sidelink communications absent external configurations. In accordance with certain aspects of the present disclosure, UE-3 may transmit an S-SSB to UE-4 for synchronization. An example slot structure 700 for the S-SSB is provided in FIG. 7.

Figure 7:
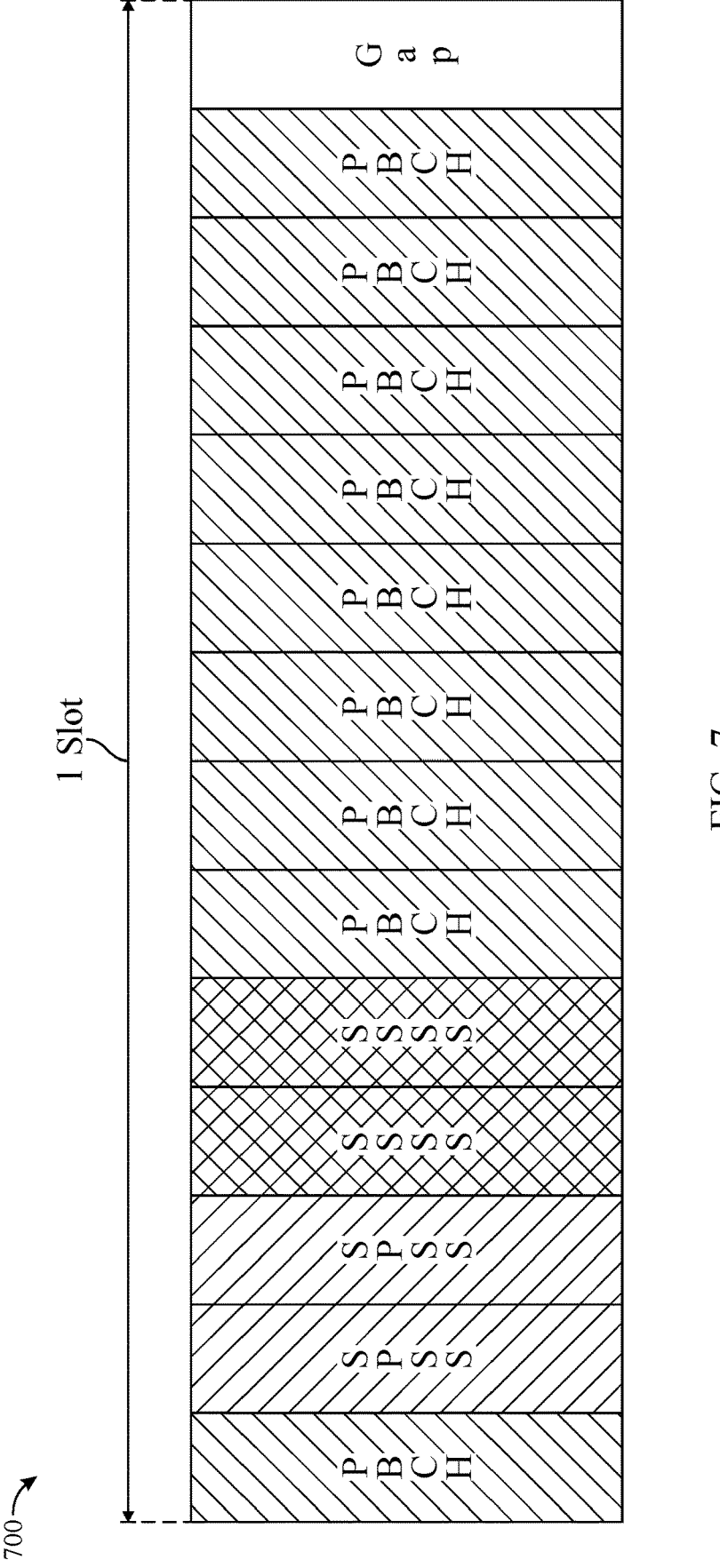
FIG. 7 shows a diagrammatic representation of a slot structure for a sidelink synchronization signal block (S-SSB), in accordance with certain aspects of the present disclosure.

As shown in FIG. 7, the S-SSB structure in one slot includes physical sidelink broadcast channel (PBCH), sidelink primary synchronization signal (SPSS), and sidelink secondary synchronization signal (SSSS). The PBCH carries information for supporting synchronization in the sidelink, including demodulation reference signal (DMRS). For example, PBCH provides system-wide information (e.g., time division duplex (TDD) configuration, frame number, slot index, network/GNSS coverage, etc.) and synchronization information required by a UE for establishing a sidelink connection. The SPSS and SSSS are used by a receiver UE to synchronize to the transmitter of the S-SSB, and may jointly be referred to as the sidelink synchronization signal (SLSS) for time and frequency synchronization. The S-SSB may use the same numerology as the PSCCH or PSSCH.

In some cases, for a normal or extended cyclic prefix (CP), the PBCH, SPSS, and SSSS are carried in the first 11 or 13 symbols of the S-SSB slot, leaving a gap or guard symbol at the end. The S-SSB may not often be transmitted in the slots of a resource pool (i.e., not multiplexed with other sidelink physical channel within the SL BWP). The frequency location of an S-SSB is often pre-configured within a sidelink BWP, such that a receiver UE needs not perform blind detection in the frequency domain to discover an S-SSB.

By detecting the SPSS and SSSS sent by a transmitter UE, a receiver UE (e.g., UE-4 of FIG. 6) may be able to synchronize to the transmitter UE (e.g., UE-3 of FIG. 6) and estimate the beginning of the frame and carrier frequency offsets. Because the transmitter UE may have already been using a common sidelink timing reference with other UEs in a sidelink network, the receiver UE may receiving sidelink communications from the other UEs after synchronizing with the transmitter UE. As such, not all UEs in the sidelink network needs to transmit the S-SSB. According to aspects of the present disclosure, a control signal may be transmitted to schedule the PSSCH that carries the discovery signal. Transmitting the control signal may provide more flexibility for the PSSCH by allowing for more available bits in the master information block (MIB) than without transmitting the control signal.

Example Discovery Signal Transmission for Sidelink Synchronization

Aspects of present disclosure provide techniques for scheduling a physical sidelink shared channel (PSSCH) that conveys system information (SI) for another UE. For example, the PSSCH may be scheduled via a control signal associated with an S-SSB that enables out-of-coverage UEs to initiate and organize sidelink networks without external configurations.

In aspects, the PSSCH conveys remaining minimum system information (RMSI) that serves as a discovery signal (DS). The DS may be scheduled by a physical sidelink control channel (PSCCH). In aspects, the control signal may include the DS scheduled by the PSCCH via a demodulation reference signal DMRS. The DS may be specified at a location with respect to the S-SSB for the receiver UE to identify.

Figure 8:
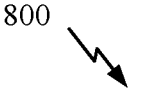
FIG. 8 is a flow diagram illustrating example operations for wireless communication by a transmitter UE, in accordance with certain aspects of the present disclosure.

FIG. 8 is a flow diagram illustrating example operations 800 for wireless communication by a first UE (e.g., a transmitter UE that transmits S-SSBs). In one non-limiting example, operations 800 may be performed by the UE 120a in the wireless communication network 100 of FIG. 1.

Operations 800 begin, at 802, by transmitting an S-SSB to be received by at least a second UE. The S-SSB may include system and synchronization information. For example, the S-SSB may have a structure similar to the S-SSB slot shown in FIG. 7.

At 804, the transmitter UE transmits a control signal associated with the S-SSB to schedule a PSSCH that conveys SI for the second UE. For example, the PSSCH may convey remaining minimum system information (RMSI) as a discovery signal (DS).

In aspects, the control signal may be a PSCCH that schedules a PSSCH that includes the DS. In some cases, the transmitter UE may indicate that the PSSCH includes the DS via a demodulation reference signal (DMRS) pattern.

Figure 9:
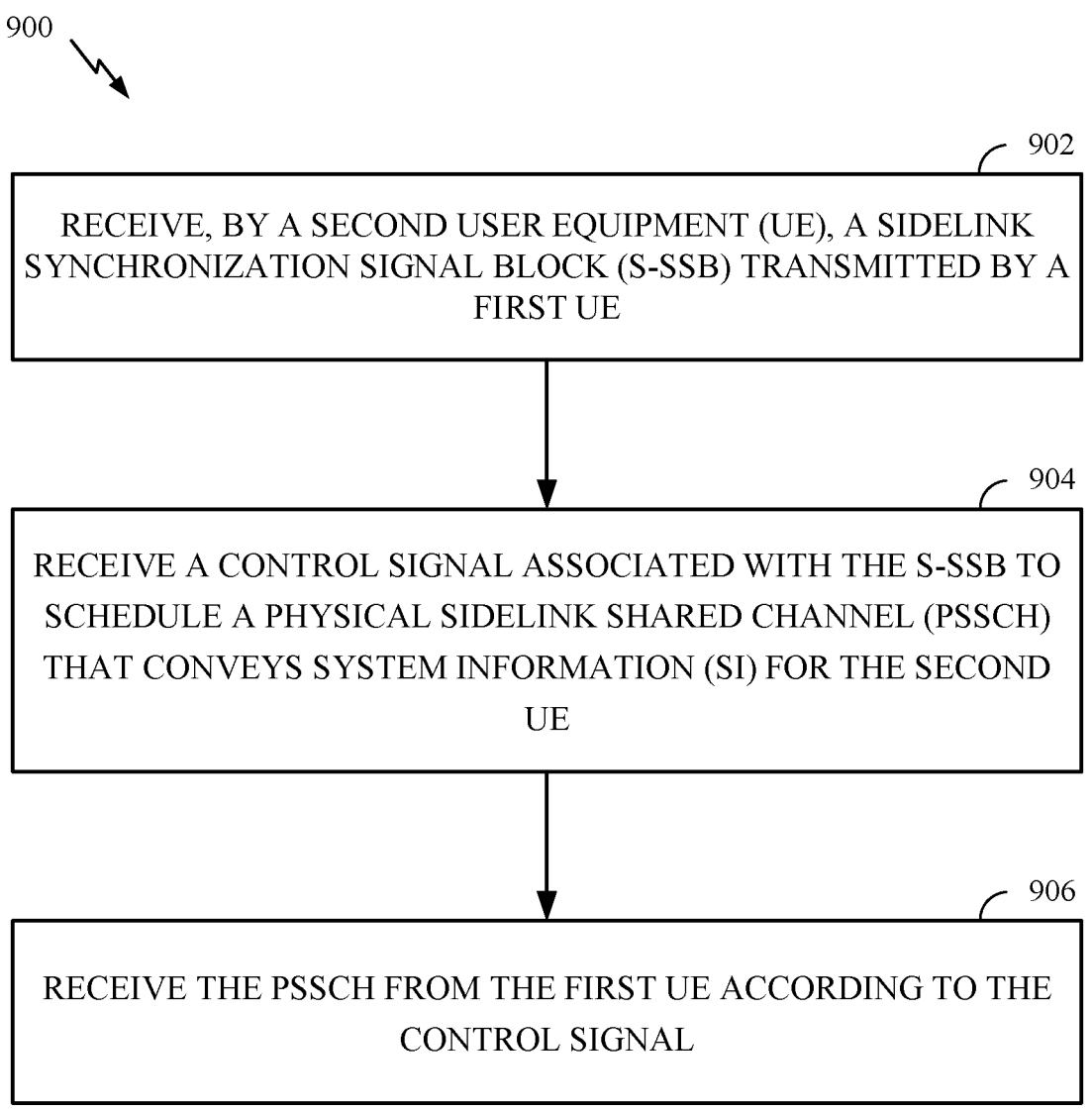
FIG. 9 is a flow diagram illustrating example operations for wireless communication by a receiver UE, in accordance with certain aspects of the present disclosure.

FIG. 9 is a flow diagram illustrating example operations 900 that may be considered complementary to the operations 800 of FIG. 8. For example, operations 900 may be performed by a receiver UE monitoring for S-SSBs from a transmitter UE (performing operations 800 of FIG. 8).

Operations 900 begin, at 902, by receiving an S-SSB transmitted by a first UE, such as the transmitter UE of operations 800. For example, the S-SSB may have a structure similar to the S-SSB slot shown in FIG. 7.

At 904, the second UE receives a control signal associated with the S-SSB to schedule a PSSCH that conveys system information (SI) for the second UE. For example, the PSSCH may convey remaining minimum system information (RMSI) as a discovery signal (DS). The DS may be conveyed by the PSSCH. In some cases, the PSSCH (including the DS) is scheduled by a PSCCH. To distinguish the scheduling PSCCH from normal sidelink PSCCH, the specific DS scheduling channel with the control signal may be referred to as the DS-PSCCH.

At 906, the second UE receives the PSSCH from the first UE according to the control signal.

In one aspect, the resource used for the control signal may be predefined at a constant or fixed location relative to the S-SSB. For example, the DS-PSCCH may occupy a fixed resource location with respect to the S-SSB. This way, the receiver UE, when discovering the S-SSB, would know where to find the PSCCH, by deriving its location based on the S-SSB location. Based on the scheduling information in the PSCCH, the receiver UE may then receive the PSSCH carrying the discovery signal (e.g., RMSI) and establish sidelink communications with the transmitter UE. In some cases, the S-SSB may additionally provide information on the control signal, such as whether one has been transmitted with the S-SSB. If the S-SSB does not indicate that the control signal has been transmitted, the receiver UE may proceed with blind detection of the control signal.

For example, the S-SSB may provide additional information of the control signal, such as using one bit in MIB to indicate whether the control signal (DS-PSCCH) is accompanying the S-SSB. In other cases, the S-SSB indicates on/off information (not the location information), such as in case some S-SSB transmitting nodes do not want to transmit discovery signal.

Figure 10:
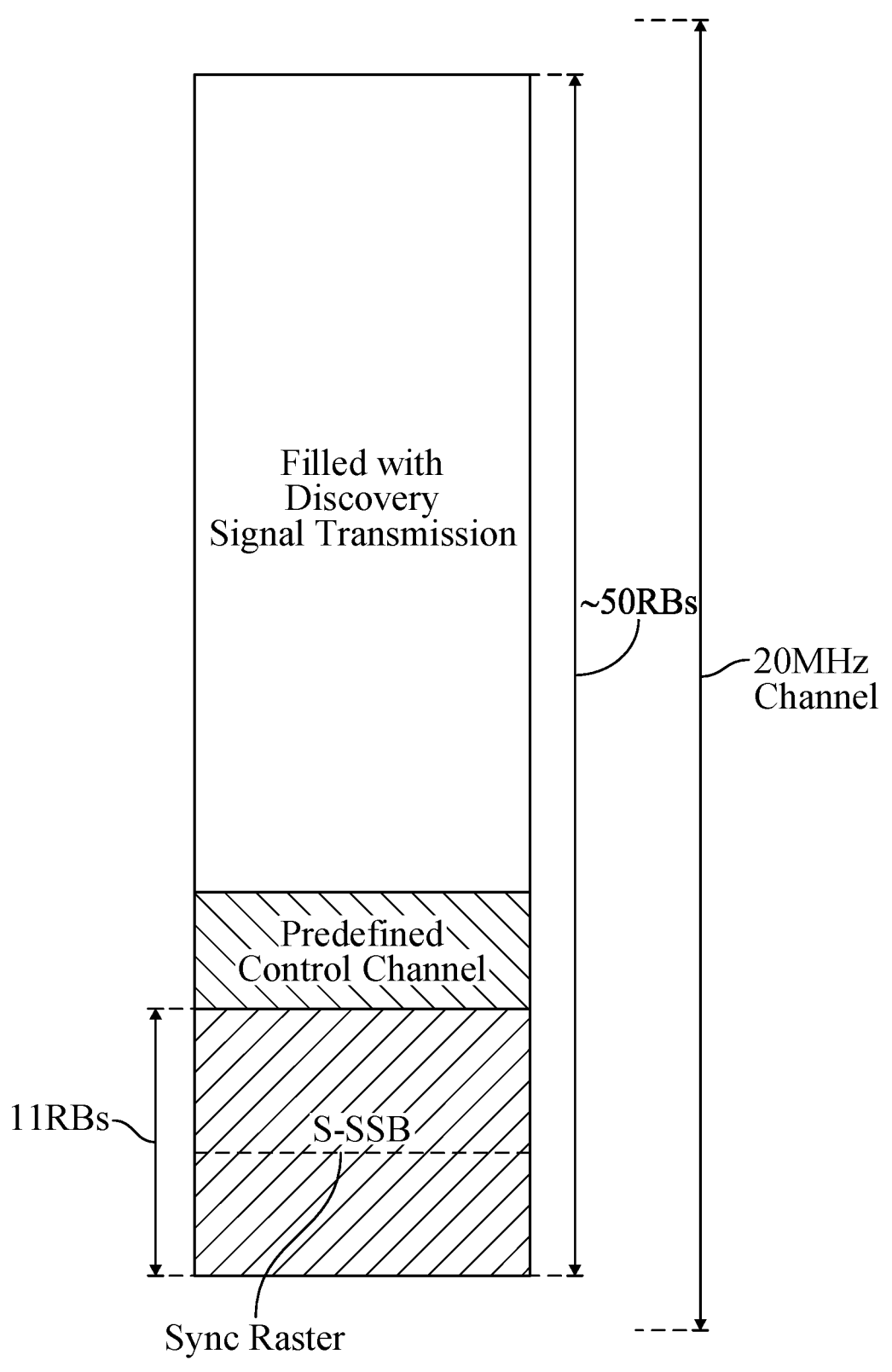
FIGS. 10-13 illustrate examples of discovery signal locations with respect to an S-SSB location, in accordance with aspects of the present disclosure.
Figure 11:
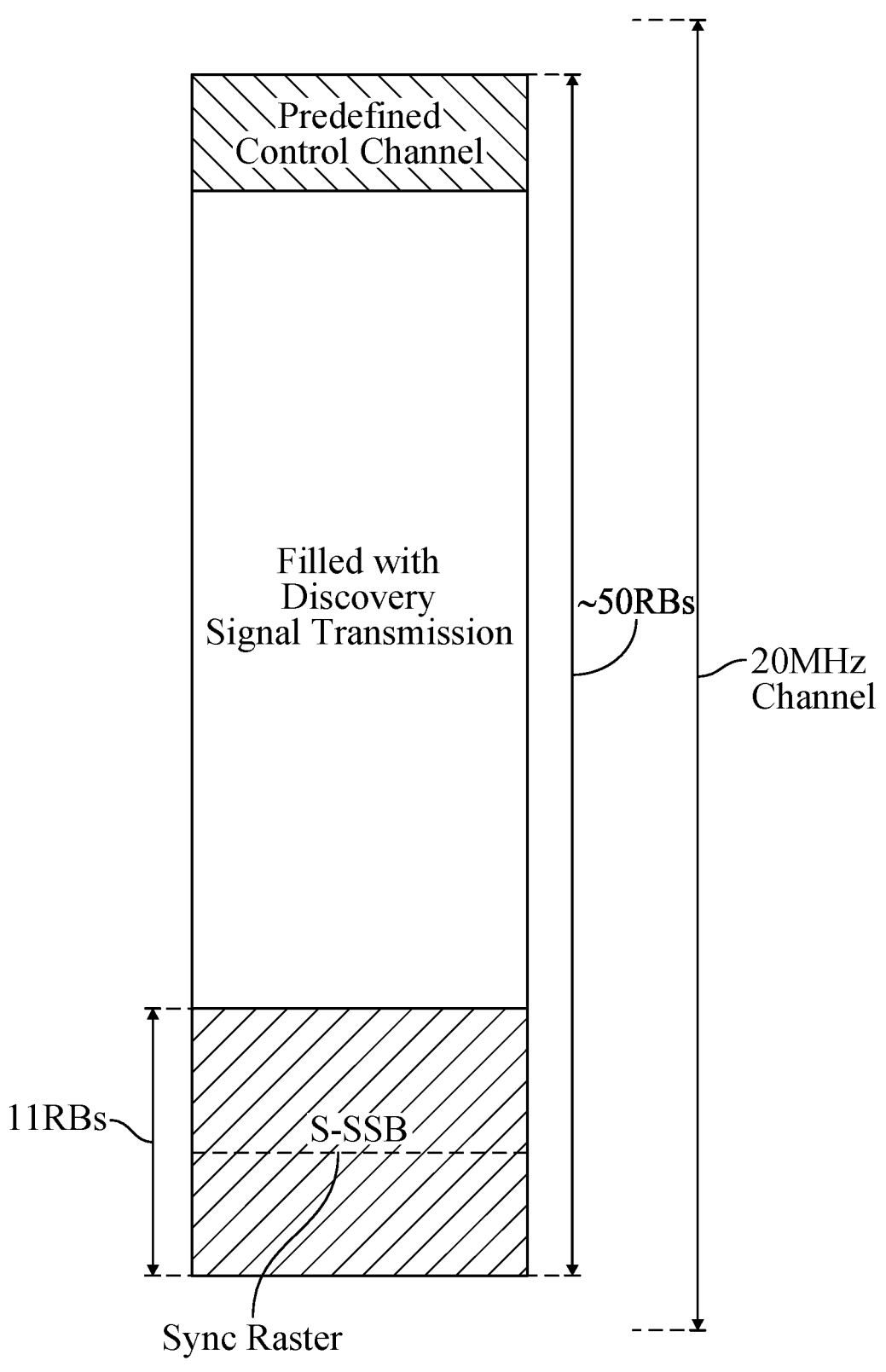

Examples of the fixed location of the control signal are illustrated in FIGS. 10-13. As shown in FIGS. 10 and 11, the control signal (i.e., the "predefined control channel") aligns with the S-SSB in the time domain. As to the frequency domain, the number of resource blocks (RBs) for the control signal may be fixed or constant. For example, the control signal may occupy four, eight, or twelve RBs. Different frequency locations may be used. In a first option, as shown in FIG. 10, the control signal may be next to the S-SSB in the frequency domain, leaving the remaining resources to be filled with DS transmission. In a second option, as shown in FIG. 11, the control signal may be located on the opposite edge of the frequency band. For example, when the sidelink S-SSB is for unlicensed band and is located near one edge of the 20 MHz channel, then the control signal may occupy the other edge of the 20 MHz channel.

Figure 12:
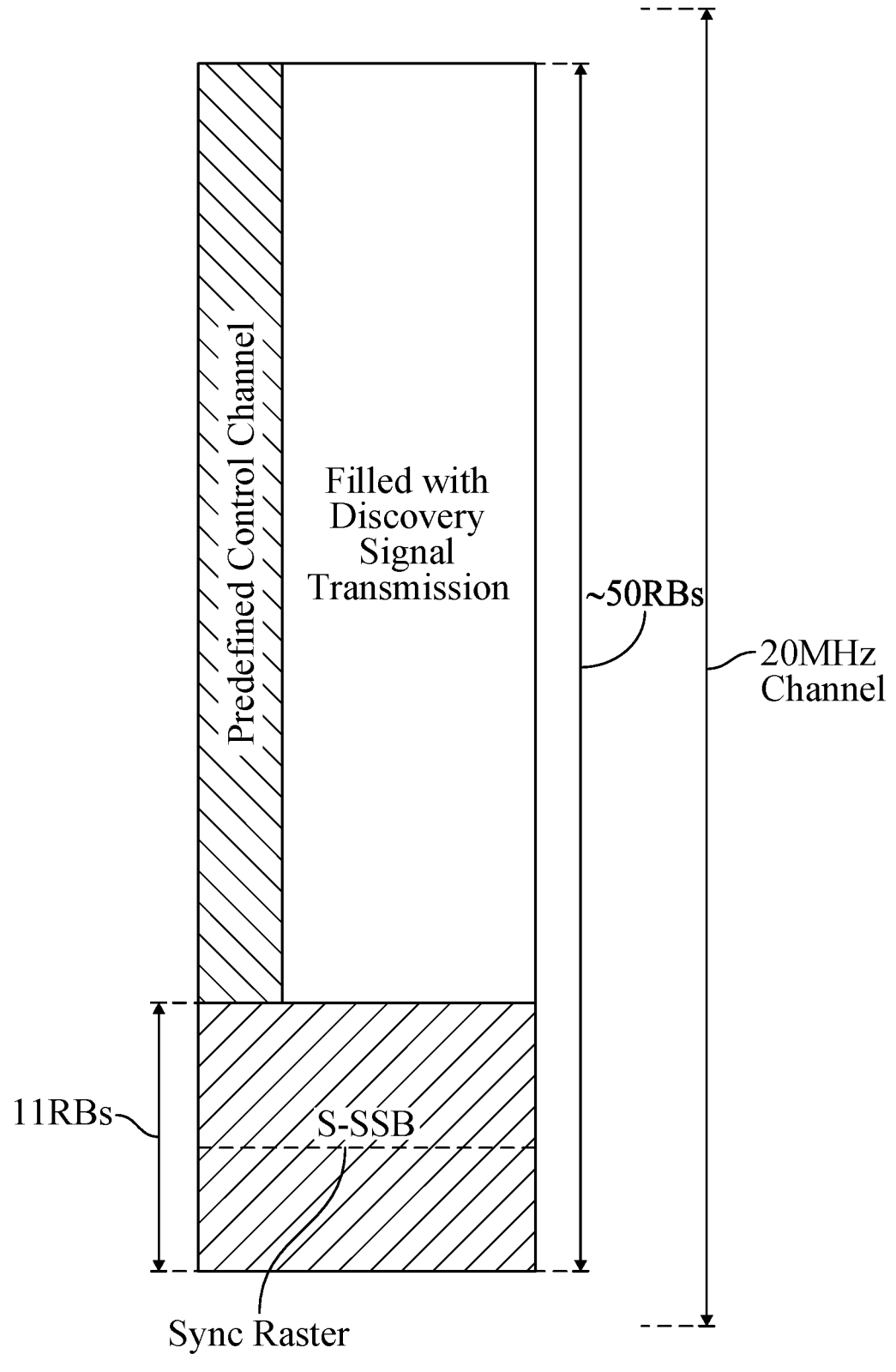

In another example illustrated in FIG. 12, the control signal may share a common starting location in the time domain with the S-SSB but may not occupy the same duration as the S-SSB. In some cases, the control signal may occupy a fixed or constant number of symbols, such as one, two, or three symbols. In the frequency domain, the control signal may use the remaining portion of the subband that is not occupied by the S-SSB. Alternatively, the control signal may occupy a fixed number of RBs, such as twelve RBs for example.

Figure 13:
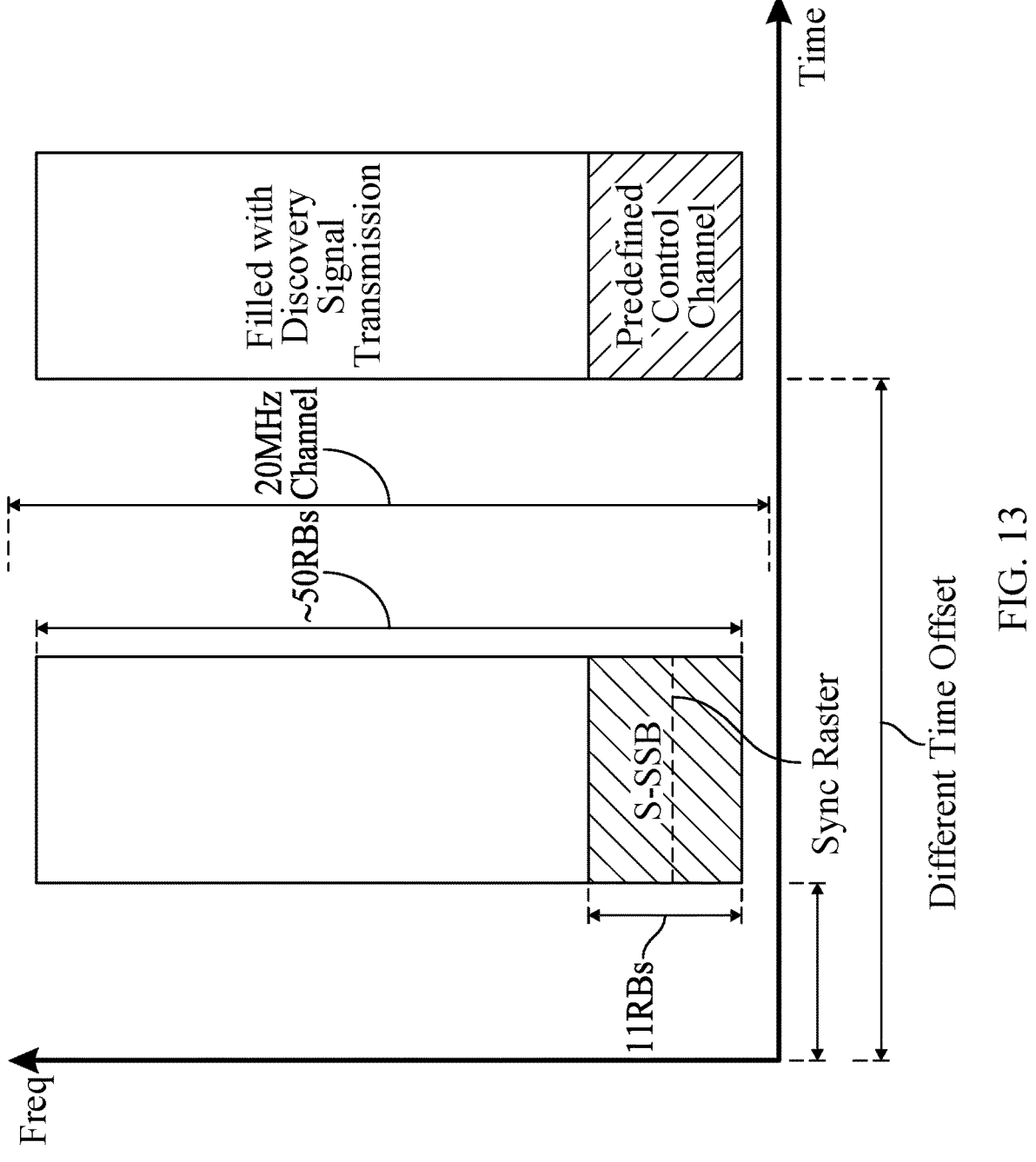

In yet another example illustrated in FIG. 13, the control signal and the S-SSB may have the same time and frequency location but may be offset by a time period. As shown, the control signal (i.e., the "predefined control channel") may occupy the same time and frequency resources as the S-SSB. In this case, the transmitter UE transmits the control signal at a different time, after a period of time offset, than the S-SSB.

In another aspect, the location of the control signal may be indicated instead of being fixed relative to the S-SSB. For example, the MIB of the S-SSB may provide information on RBs used for the control signal to inform the receiver UE about the location of the control signal. As such, the receiver UE may find the control signal based on the S-SSB, with greater flexibility than the fixed-location situation with the tradeoff being potentially using more resources in the MIB for the indication.

In some cases, the location and size of resource allocations (and any combination thereof) for the control signal may be pre-defined. The MIB may need indicate which one of a set of pre-defined configurations has been utilized (i.e., without repeating the detailed resource allocation information of the location and size). For example, a first pre-defined configuration may indicate a first symbol size and location and a first subcarrier size and location used for the control signal transmission; a second pre-defined configuration may indicate a second symbol size and location and a second subcarrier size and location used for the control signal transmission. The MIB may indicate which one of the first or the second pre-defined configuration of the control signal is transmitted. This allows for an aggregation level control, similar to the aggregation level control for a Uu PDCCH. Techniques described above may be used to indicate whether the control signal is transmitted with the S-SSB (e.g., using one bit in the MIB to indicate whether such control signal is transmitted along with the S-SSB).

In certain aspects, the control signal (DS-PSCCH) may have a distinct set of structure and content different from other sidelink channels, such as normal PSCCH, PSSCH, PBCH, and PSFCH. The structure and content may be related to coding, modulation, reference signals, and resource allocations, among others. For example, the structure of the control signal may include a fixed information size of 24 bits cyclic redundancy check (CRC). The modulation of the control signal may be quadrature phase shift keying (QPSK). The content of the control signal may include the resource allocation for the PSSCH that carries system information, such as the RMSI.

In some cases, if the PSSCH carrying the RMSI is aligned with the control signal in time, then the control signal may need to provide the frequency domain resource allocation (FDRA) only. For example, when the receiver UE attempts to establish a sidelink with the transmitter UE, the receiver UE may not have a proper sidelink configuration. The control signal from the transmitter UE may then provide the basic FDRA unit (i.e., an RB) and use the FDRA to indicate the starting RB and the length of occupied RBs, with respect to the control signal location.

In some cases, if the PSSCH carrying the RMSI is aligned with the control signal in frequency, then the control signal may need to provide the time domain resource allocation (TDRA) only. For example, the basic unit for TDRA is a slot. When the receiver UE attempts to establish a sidelink with the transmitter UE, the receiver UE may be provided the starting slot and the duration of occupied slots with respect to the control signal location, indicated by the TDRA from the transmitter UE.

In some cases, when the PSSCH carrying the RMSI does not align with the control signal in either time or frequency, then both FDRA and TDRA are provided in the control signal.

In some cases, the control signal may further indicate the modulation and coding scheme (MCS), such as polar coding. The control signal may further indicate a time pattern and number of ports of PSSCH DMRS, and/or a DMRS pattern.

In some cases, in order to avoid unnecessary discovery/decoding attempts, the control signal may further include UE identity information to allow the receiver UE to decide whether a sidelink connection is desirable. The control signal may also provide information on the service provided by the transmitter UE, so that the receiver UE and other nodes may selectively connect to the transmitter UE. For example, the transmitter UE may indicate that the transmitter UE has the capability to connect to certain public land mobile network (PLMN), so that the transmitter UE may serve as a relay UE to the receiver UE and other nodes. In some cases, the control signal may provide information on the destination UE (e.g., in a unicast use case) or information of groupcast. In some cases, the identify information, service information, unicast or group cast information may be included in the RMSI when the control signal does not include such information.

Figure 14:
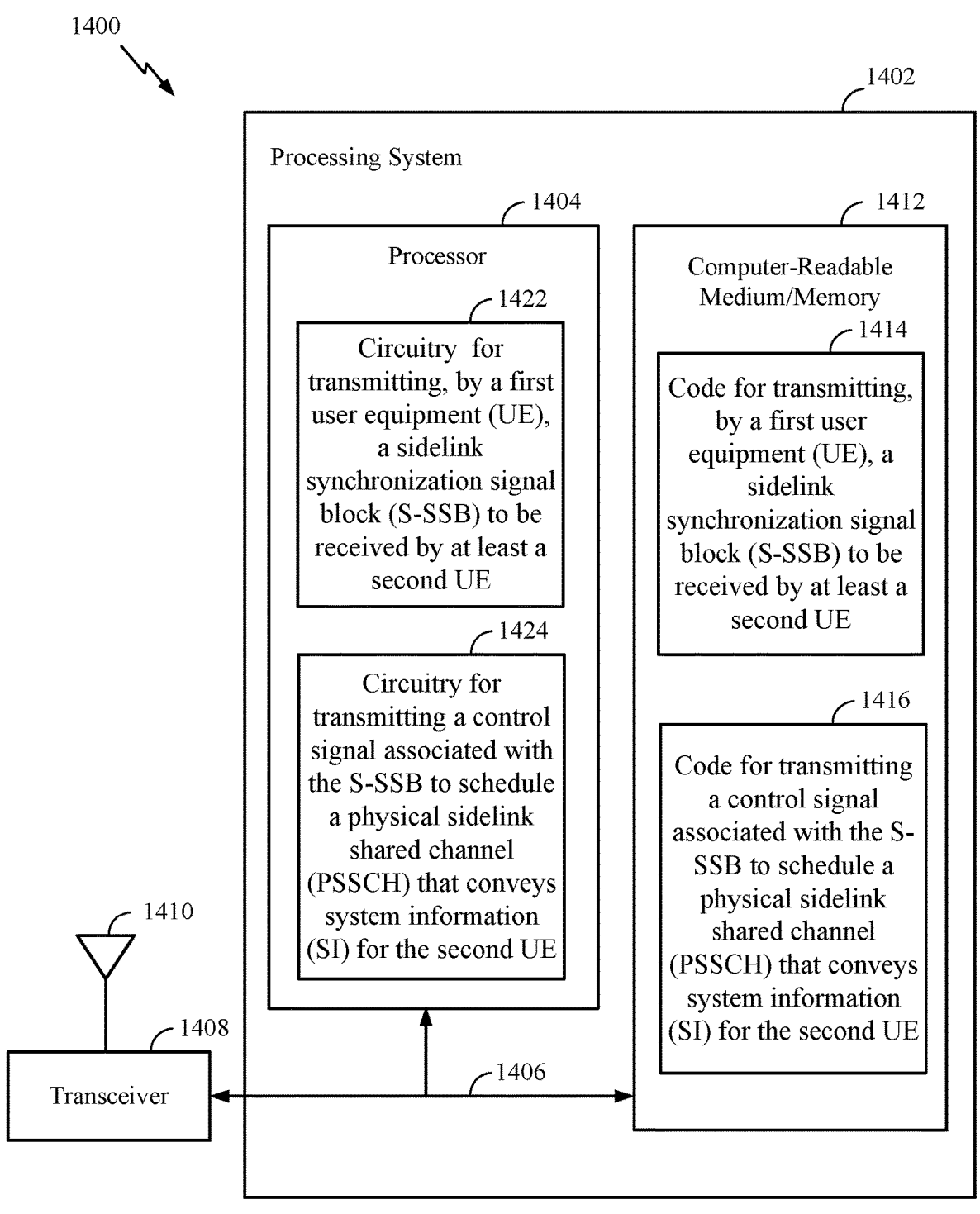
FIG. 14 illustrates a communications device that may include various components configured to perform operations for techniques disclosed herein, in accordance with aspects of the present disclosure.

FIG. 14 illustrates a communications device 1400 that may include various components (e.g., corresponding to means-plus-function components) configured to perform operations for techniques disclosed herein, such as operations illustrated in FIG. 8. The communications device 1400 includes a processing system 1402 coupled to a transceiver 1408 (e.g., a transmitter and/or a receiver). The transceiver 1408 is configured to transmit and receive signals for the communications device 1400 via an antenna 1410. The processing system 1402 may be configured to perform processing functions for the communications device 1400, including processing signals received and/or to be transmitted by the communications device 1400.

The processing system 1402 includes a processor 1404 coupled to a computer-readable medium/memory 1415 via a bus 1406. The computer-readable medium/memory 1415 is configured to store instructions (e.g., computer-executable code) that when executed by the processor 1404, cause the processor 1404 to perform the operations illustrated in FIG. 8.

The computer-readable medium/memory 1412 stores code 1414 for transmitting a sidelink synchronization signal block (S-SSB) for discovery by at least a second UE, and code 1416 for transmitting a control signal associated with the S-SSB to schedule a physical sidelink shared channel (PSSCH) that conveys system information (SI) for the second UE. The processing system 1402 includes circuitry 1422 for transmitting a sidelink synchronization signal block (S-SSB) for discovery by at least a second UE, and circuitry 1424 for transmitting a control signal associated with the S-SSB to schedule a physical sidelink shared channel (PSSCH) that conveys system information (SI) for the second UE.

Means for transmitting may include a processor (e.g., the controller/processor 280), one or more antennas (e.g., the antennas 242 or the antenna 1410), and/or circuitry for transmitting (e.g., the circuitry 1422 or 1424 for transmitting). Means for scheduling a PSSCH may include a processor (e.g., the controller/processor 280). Means for synchronizing may include a processor (e.g., the controller/processor 280) and/or circuitry for synchronizing (e.g., the discovery signal manager 122a). In certain aspects, various processors and/or various circuitry may include a circuit, a CPU, a GPU, a DSP, an ASIC, a FPGA, or other PLD, discrete gate or transistor logic, discrete hardware components, or any combination thereof designed to perform the functions described here.

Figure 15:
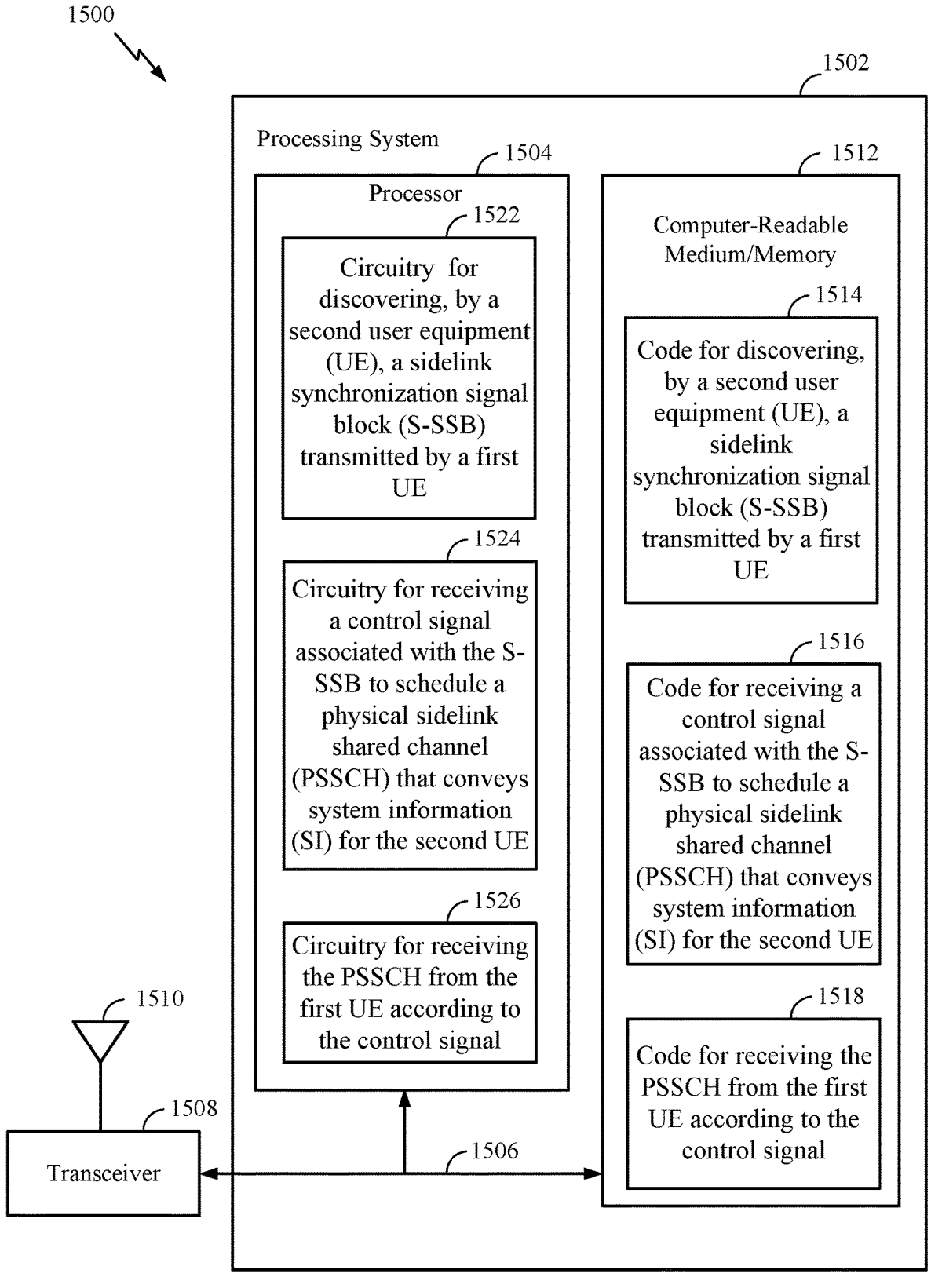
FIG. 15 illustrates a communications device that may include various components configured to perform operations for techniques disclosed herein, in accordance with aspects of the present disclosure.

FIG. 15 illustrates a communications device 1500 that may include various components (e.g., corresponding to means-plus-function components) configured to perform operations for techniques disclosed herein, such as operations illustrated in FIG. 9. The communications device 1500 includes a processing system 1502 coupled to a transceiver 1508 (e.g., a transmitter and/or a receiver). The transceiver 1508 is configured to transmit and receive signals for the communications device 1500 via an antenna 1510. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. The computer-readable medium/memory 1512 is configured to store instructions (e.g., computer-executable code) that when executed by the processor 1504, cause the processor 1504 to perform the operations illustrated in FIG. 9.

The computer-readable medium/memory 1512 stores code 1514 for receiving a sidelink synchronization signal block (S-SSB) transmitted by a first UE, code 1516 for receiving a control signal associated with the S-SSB to schedule a physical sidelink shared channel (PSSCH) that conveys system information (SI) for the second UE, and code 1518 for receiving the PSSCH from the first UE according to the control signal. The processing system 1502 includes circuitry 1522 for receiving a sidelink synchronization signal block (S-SSB) transmitted by a first UE, circuitry 1524 for receiving a control signal associated with the S-SSB to schedule a physical sidelink shared channel (PSSCH) that conveys system information (SI) for the second UE, and circuitry 1526 for receiving the PSSCH from the first UE according to the control signal.

Means for receiving may include a processor (e.g., the controller/processor 280), one or more antennas (e.g., the antennas 242 or the antenna 1510), and/or circuitry for receiving (e.g., the circuitry 1522, 1524, or 1526 for receiving). Means for scheduling a PSSCH may include a processor (e.g., the controller/processor 280). Means for synchronizing may include a processor (e.g., the controller/processor 280) and/or circuitry for synchronizing (e.g., the discovery signal manager 122b). In certain aspects, various processors and/or various circuitry may include a circuit, a CPU, a GPU, a DSP, an ASIC, a FPGA, or other PLD, discrete gate or transistor logic, discrete hardware components, or any combination thereof designed to perform the functions described here.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, which may be narrowband IoT (NB-IOT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:
    transmitting a sidelink synchronization signal block (S-SSB) for discovery by at least a second UE; and
    transmitting a control signal associated with the S-SSB to schedule a physical sidelink shared channel (PSSCH) that conveys system information (SI) for the second UE, wherein the control signal comprises a physical sidelink control channel (PSCCH), and wherein the PSCCH occupies a fixed resource location with respect to the S-SSB.

2. The method of claim 1, wherein the PSSCH conveys remaining minimum system information (RMSI) as a discovery signal (DS).

3. The method of claim 1, wherein the PSCCH indicates that the PSSCH carries the DS via a demodulation reference signal (DMRS) pattern.

4. The method of claim 1, wherein the S-SSB provides information on whether the PSCCH has been transmitted with the S-SSB.

5. The method of claim 1, wherein a bit in a master information block (MIB) provides information on whether the PSCCH has been transmitted with the S-SSB.

6. The method of claim 1, wherein the PSCCH is aligned in the time domain with the S-SSB and occupies a fixed number of resource blocks (RBs) in the frequency domain.

7. The method of claim 1, wherein the DS is aligned in the frequency domain with the S-SSB and occupies a fixed number of symbols in the time domain.

8. The method of claim 7, wherein the DS occupies:
    a fixed number of resource blocks (RBs) in the frequency domain; or
    a remaining portion of unlicensed band that is not occupied by the S-SSB.

9. The method of claim 1, wherein:
    the S-SSB occupies at least first time and frequency resources in a first time occasion; and
    the PSCCH occupies the first time and frequency resources in a second time occasion.

10. The method of claim 1, wherein the S-SSB comprises a master information block (MIB) providing the fixed resource location of the PSCCH with respect to the S-SSB.

11. The method of claim 10, wherein the MIB indicates a predefined set of resource blocks (RBs) used for transmitting the PSCCH.

12. The method of claim 1, wherein the PSCCH provides frequency domain resource allocation (FDRA) when the PSSCH is aligned with the PSCCH in time, wherein the FDRA indicates a starting resource block and a length of resource blocks of the PSSCH with respect to the PSCCH's location.

13. The method of claim 1, wherein the PSCCH provides time domain resource allocation (TDRA) when the PSSCH is aligned with the PSCCH in frequency, wherein the TDRA indicates a starting slot and a duration of occupied slots of the PSSCH with respect to the PSCCH's location.

14. The method of claim 1, wherein the PSCCH provides both frequency domain resource allocation (FDRA) and time domain resource allocation (TDRA) when the PSCCH does not align with the PSSCH.

15. The method of claim 1, wherein the PSCCH comprises at least one of: identify information of the second UE, services provided by the second UE, destination information, or groupcast information.

16. A method for wireless communications by a second user equipment (UE), comprising:
    receiving a sidelink synchronization signal block (S-SSB) transmitted by a first UE;
    receiving a control signal associated with the S-SSB to schedule a physical sidelink shared channel (PSSCH) that conveys system information (SI) for the second UE, wherein the control signal comprises a physical sidelink control channel (PSCCH), and wherein the PSCCH occupies a fixed resource location with respect to the S-SSB; and
    receiving the PSSCH from the first UE according to the control signal.

17. The method of claim 16, wherein the PSSCH conveys remaining minimum system information (RMSI) as a discovery signal (DS).

18. The method of claim 16, wherein the PSCCH indicates that the PSSCH carries the DS via a demodulation reference signal (DMRS) pattern.

19. The method of claim 16, wherein the S-SSB provides information on whether the PSCCH has been transmitted with the S-SSB.

20. The method of claim 16, wherein a bit in a master information block (MIB) provides information on whether the PSCCH has been transmitted with the S-SSB.

21. The method of claim 16, wherein the PSCCH is aligned in the time domain with the S-SSB and occupies a fixed number of resource blocks (RBs) in the frequency domain.

22. The method of claim 16, wherein the DS is aligned in the frequency domain with the S-SSB and occupies a fixed number of symbols in the time domain.

23. The method of claim 22, wherein the DS occupies:
    a fixed number of resource blocks (RBs) in the frequency domain; or
    a remaining portion of unlicensed band that is not occupied by the S-SSB.

24. An apparatus for wireless communication at a first user equipment, comprising:
    at least one processor; and
    memory coupled to the at least one processor, the memory including code executable by the at least one processor to cause the apparatus to:
        transmit a sidelink synchronization signal block (S-SSB) for discovery by at least a second UE; and transmit a control signal associated with the S-SSB to schedule a physical sidelink shared channel (PSSCH) that conveys system information (SI) for the second UE, wherein the control signal comprises a physical sidelink control channel (PSCCH), and wherein the PSCCH occupies a fixed resource location with respect to the S-SSB.

25. The apparatus of claim 24, wherein the PSSCH conveys remaining minimum system information (RMSI) as a discovery signal (DS).

26. An apparatus for wireless communication at a second user equipment, comprising:

at least one processor; and memory coupled to the at least one processor, the memory including code executable by the at least one processor to cause the apparatus to:

receive a sidelink synchronization signal block (S-SSB) transmitted by a first UE;

receive a control signal associated with the S-SSB to schedule a physical sidelink shared channel (PSSCH) that conveys system information (SI) for the second UE, wherein the control signal comprises a physical sidelink control channel (PSCCH), and wherein the PSCCH occupies a fixed resource location with respect to the S-SSB; and receive the PSSCH from the first UE according to the control signal.

\* \* \* \* \*